(12) United States Patent
Deiser et al.

(10) Patent No.: US 9,205,607 B2
(45) Date of Patent: Dec. 8, 2015

(54) TIRE REPAIR TOOL, SYSTEM AND METHOD OF USE

(71) Applicant: PATCH N RIDE LLC, Hollywood, FL (US)

(72) Inventors: Alexander Deiser, Boca Raton, FL (US); George Fetko, Deerfield Beach, FL (US)

(73) Assignee: PATCH N RIDE LLC, Hollywood, FL (US)

( * ) Notice: Subject to any disclaimer, the term of this patent is extended or adjusted under 35 U.S.C. 154(b) by 274 days.

(21) Appl. No.: 14/092,404

(22) Filed: Nov. 27, 2013

(65) Prior Publication Data

US 2015/0143958 A1    May 28, 2015

(51) Int. Cl.
*B29C 73/10*    (2006.01)
*B29C 73/12*    (2006.01)

(52) U.S. Cl.
CPC .................. *B29C 73/10* (2013.01); *B29C 73/12* (2013.01)

(58) Field of Classification Search
CPC ........ B29C 73/10; B29C 73/12; B29C 73/02; B29C 73/04; B29C 73/06; B60C 25/16; Y10T 152/10909
USPC ............................ 81/15.5, 15.6, 15.7; 156/97
See application file for complete search history.

(56) References Cited

U.S. PATENT DOCUMENTS

| | | | |
|---|---|---|---|
| 490,369 A * | 1/1893 | Sloper | B29C 73/08 152/313 |
| 557,851 A | 4/1896 | Mercier | |
| 607,379 A | 7/1898 | Jones | |
| 611,414 A * | 9/1898 | Meeker | B29C 73/08 152/370 |
| 1,942,116 A | 1/1934 | Mullen | |
| 2,646,707 A | 7/1953 | Notz | |
| 2,966,190 A | 12/1960 | Nowotny | |
| 2,990,736 A | 7/1961 | Crandall | |
| 3,013,454 A * | 12/1961 | Gruber | B29C 73/08 152/370 |
| 3,052,141 A | 9/1962 | Mitchell | |
| 3,083,597 A | 4/1963 | Best | |
| 3,162,230 A * | 12/1964 | Best | B29C 73/08 152/370 |
| 3,250,156 A * | 5/1966 | Best | B29C 73/08 152/370 |
| 3,400,445 A * | 9/1968 | Crandall et al. | B29C 73/08 152/370 |
| 4,142,428 A * | 3/1979 | Vielman | B29C 73/06 81/15.5 |
| 4,502,355 A | 3/1985 | Squyres | |
| 5,609,715 A * | 3/1997 | Gallentine | B29C 73/066 152/370 |
| 7,377,197 B1 | 5/2008 | Lin | |
| 8,707,829 B2 * | 4/2014 | Kerner | B29C 73/08 81/15.2 |
| 2006/0117909 A1 * | 6/2006 | Hsu | B29C 73/025 81/15.6 |
| 2013/0031759 A1 * | 2/2013 | Cole | B29C 73/06 29/402.01 |

* cited by examiner

*Primary Examiner* — David B Thomas
(74) *Attorney, Agent, or Firm* — Laurence Greenberg; Werner Stemer; Ralph Locher

(57) ABSTRACT

A tire repair tool includes a body portion and a cartridge portion. The tool is used to inject an adhesive or glue and a patch assembly into a puncture in a tire, while the tire is still engaged with the wheel, in order to permanently patch a punctured inner tube of the tire. More particularly, a spring is used to eject a patch assembly and adhesive through an outlet tube of the tool and into the existing puncture of the outer tire. A patch is affixed over a puncture in the inner tube by the adhesive to permanently patch the inner tube without having to remove the tire from the wheel or rim.

20 Claims, 8 Drawing Sheets

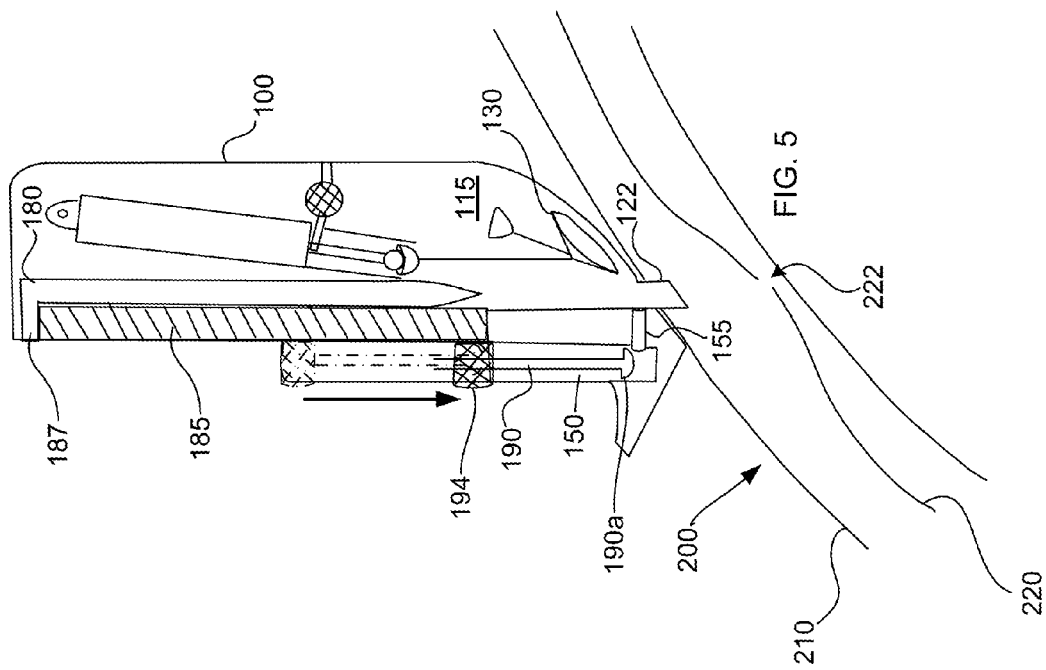
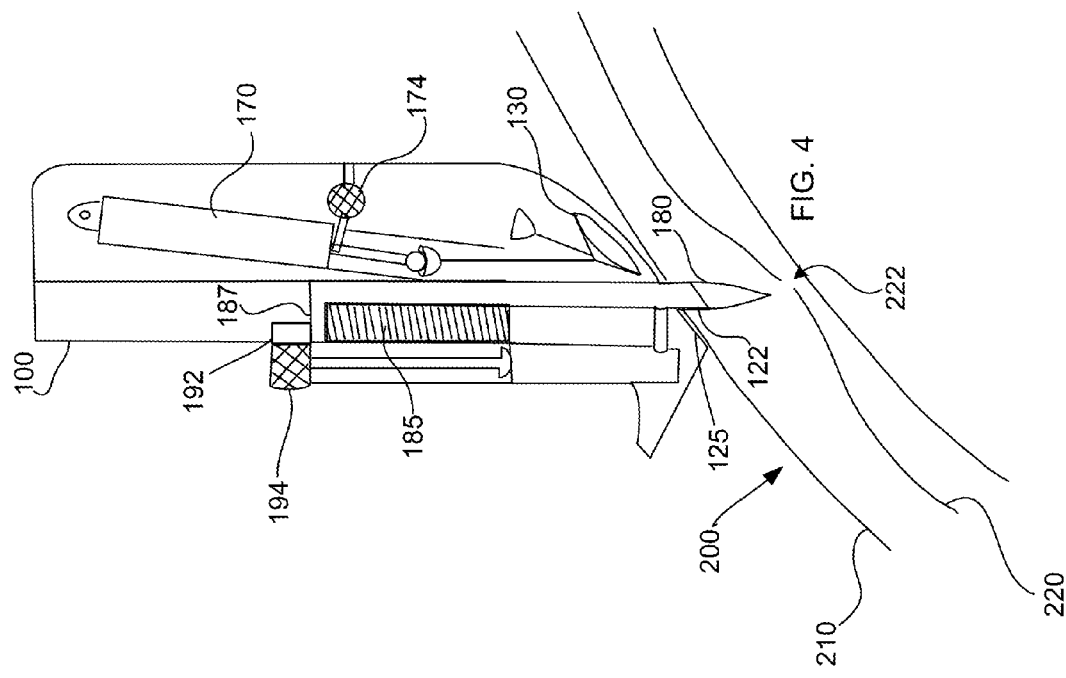

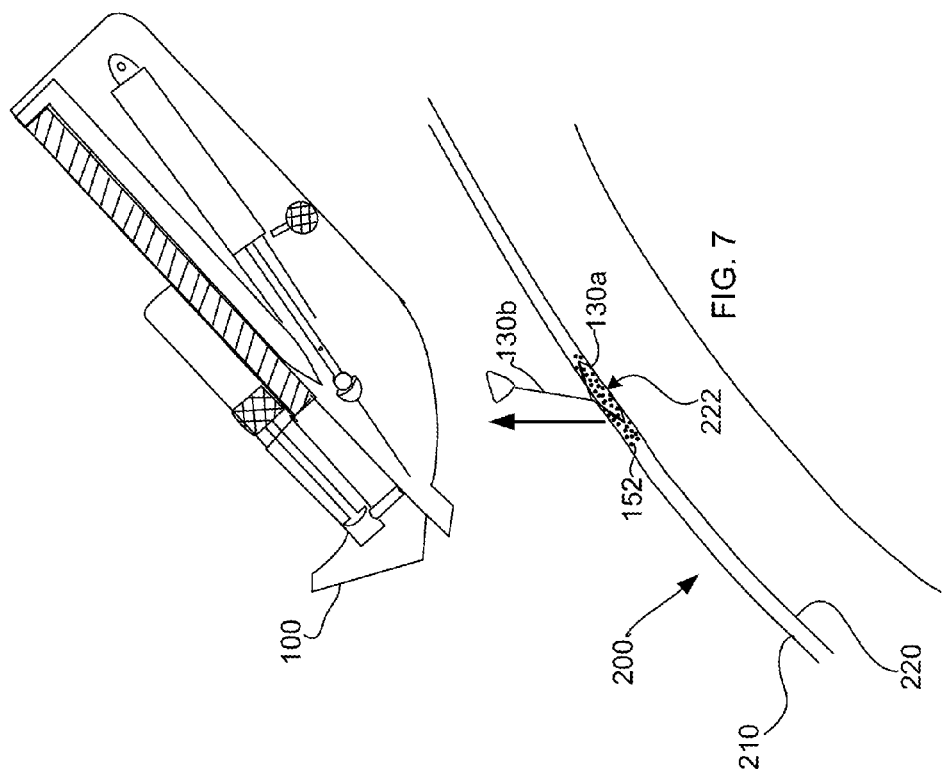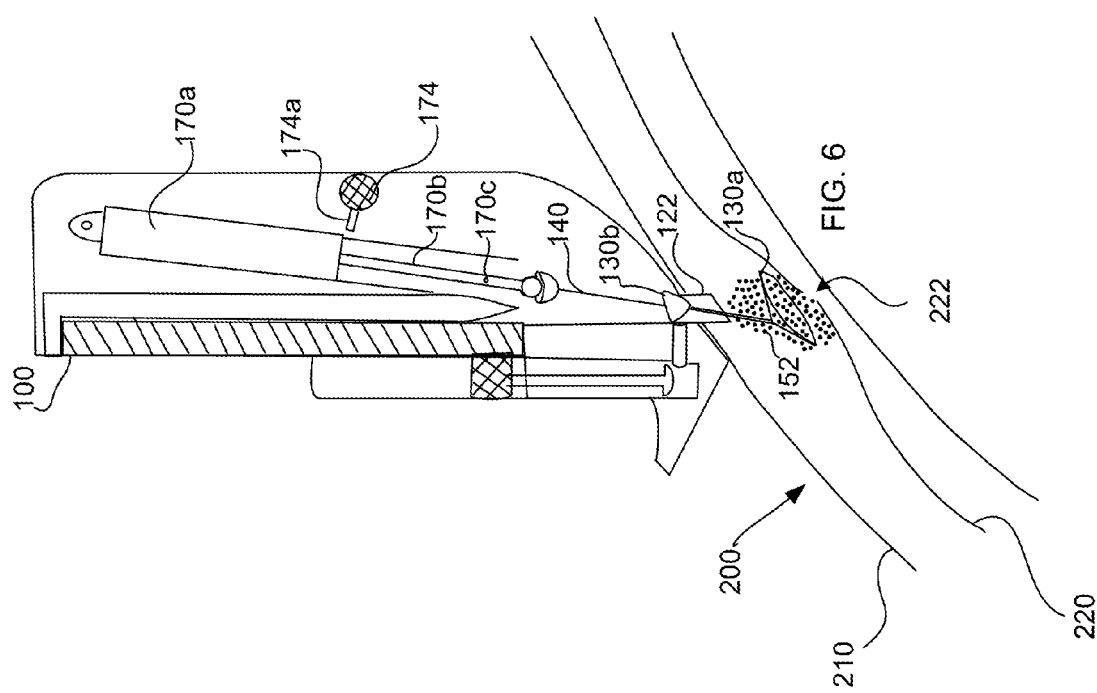

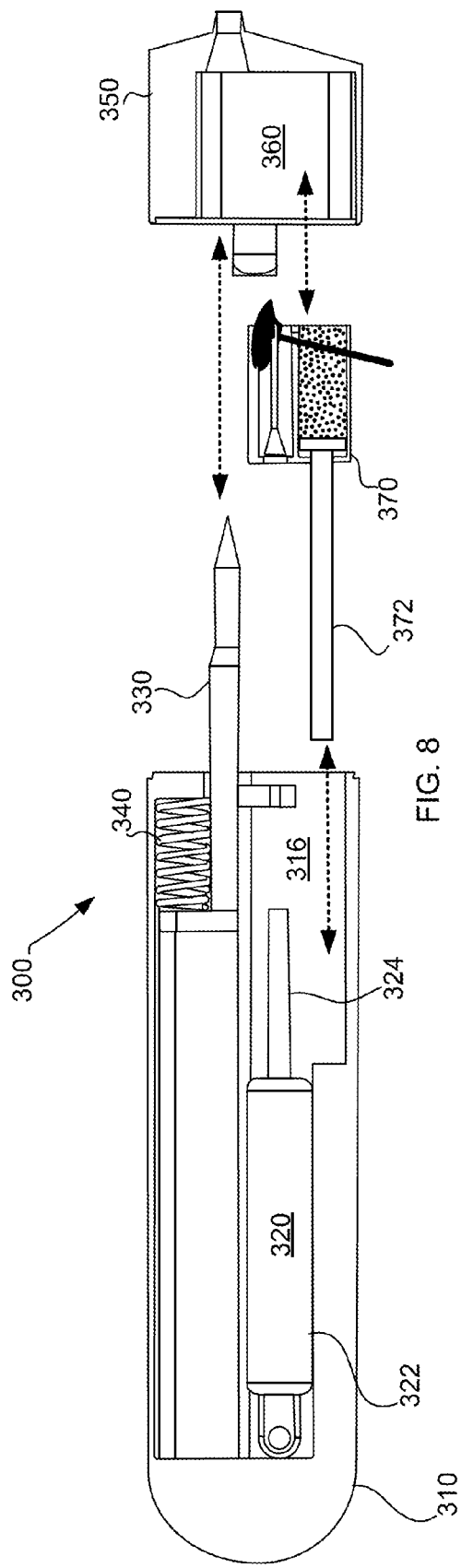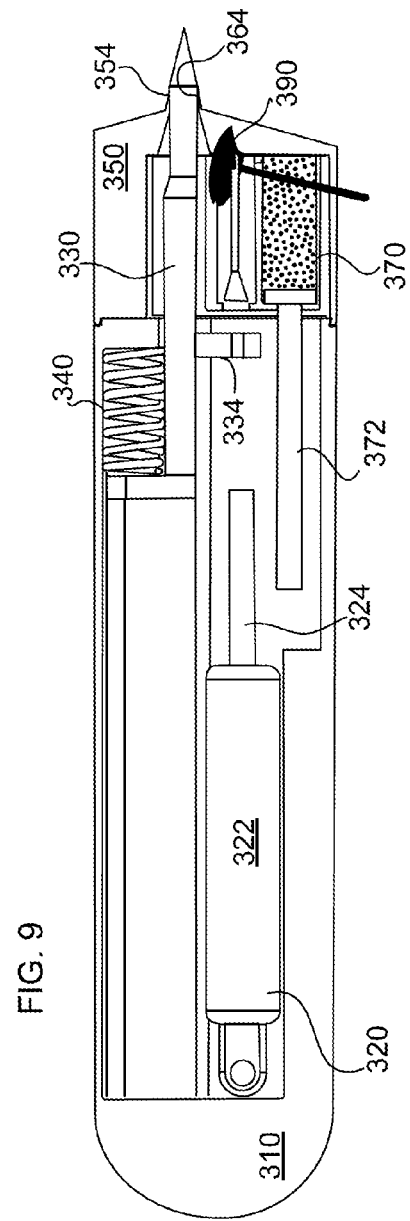

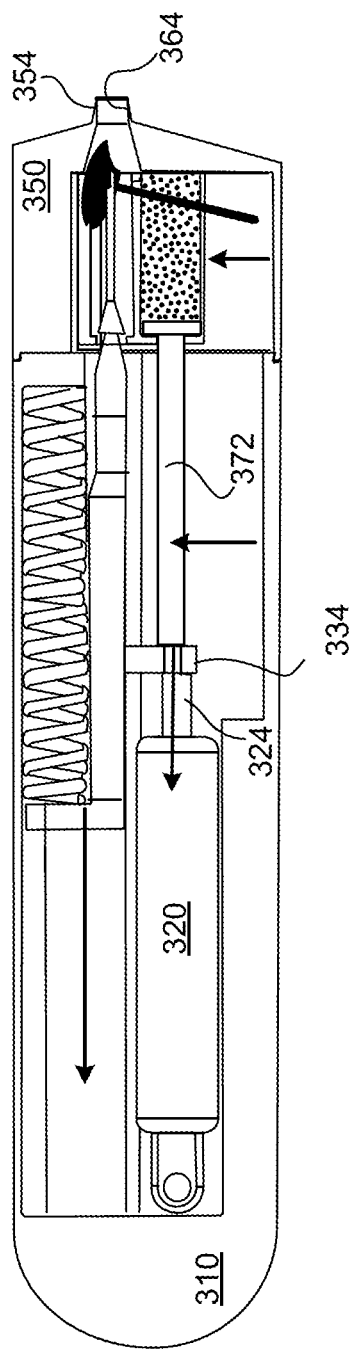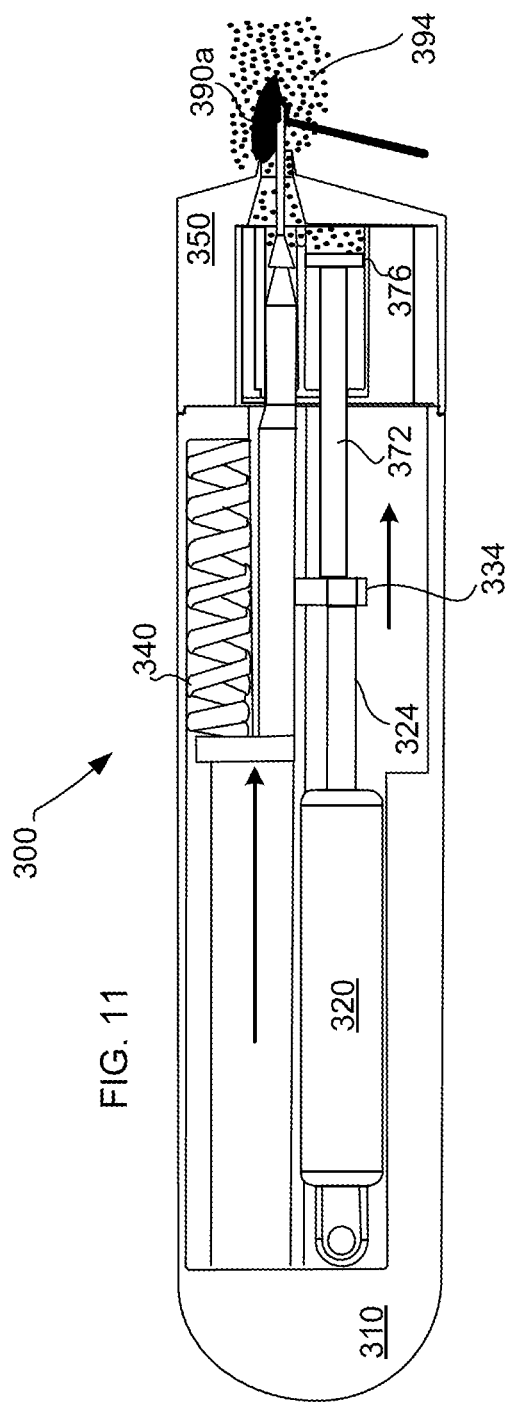

TIRE REPAIR TOOL, SYSTEM AND METHOD OF USE

BACKGROUND OF THE INVENTION

1. Field of the Invention

The present invention relates to a tire repair tool and, more particularly, to a tire repair tool, system and method for permanently patching tires, in situ, without removing the tire from the wheel or the wheel from the conveyance.

2. Description of the Related Art

Conventional methods for patching exterior punctures of a tire require removing the tire from the wheel for patching and, subsequently, reinstalling the tire on the wheel. This is the traditional way to patch clincher-type bicycle tires. See, for example, U.S. Pat. No. 4,502,355 to Squyres. However, the removal, patching and reinstallation of the tire, using these methods, is very time consuming.

What is needed is the ability to repair a tire without having to remove the tire from the wheel, and/or the wheel from the vehicle.

Some tire repair methods and devices have been disclosed that propose to repair a puncture to the tire without removing it from the wheel. For example, U.S. Pat. No. 2,990,736 to Crandall discloses a tire repair device for repairing punctures in tubeless vehicle tires. In Crandall, a hole expanding means is provided which includes a rigid probe member adapted to follow a nail hole and to deposit lubricant and/or cementing adhesive on the walls of the hole. After the probe member is withdrawn, in Crandall, it may be inserted into a hollow cylindrical guide sleeve member provided with a tapered expandable end, said tapered end merging with the probe tip to permit the probe and guide members to be forced into and through a puncture hole to expand the same. A repair plug carrier is also provided which is adapted to receive and hold a resilient plug element including an outwardly and backwardly flared head portion of outwardly tapering cross section and a tail section of relatively small diameter. In Crandall, the tail section is grasped at one end of the plug carrier to longitudinally stretch and draw the plug member into the plug carrier tube until the headed portion sits against one end of the tube of the repair plug carrier.

U.S. Pat. No. 2,966,190 to Nowotny discloses a cartridge plug tire patching apparatus for repairing punctures in tubeless tires without their removal from their rims. In Nowotny, a cartridge loaded with, among other things, a mushroom-shaped plug and a bonding agent is used with a tool. See also, for example, U.S. Pat. No. 607,379 to Jones, disclosing a repair kit for single tube bicycle tires and U.S. Pat. No. 557,851 to Mercier, disclosing a method of repairing pneumatic tires.

While the foregoing references disclose tire repair for tubeless tires, a repair device, system and method for repairing tires having an inner tube are additionally needed.

Additionally, tubular, or sew-up, bicycle tires are known wherein the tire is a one piece system in which a tire is sewn together around the inner tube. Tubular tires are used on special rims and are held to the rim by glue or two sided tape. Traditionally, if a tubular tire were punctured, it would have to be removed from the rim, discarded, replaced with a new, intact tubular tire and re-glued to the rim, as the inner tube was not accessible for repair, even after removal of the tire from the rims. Thus, there is a need for a repair device, kit, system and/or method that can be used to repair the inner tube of a tire that is not accessible through the outer tire covering, even when removed from the rim (i.e., such as a tubular tire).

U.S. Pat. No. 2,646,707 to Notz discloses a method for repairing punctures in pneumatic tires and tubes which includes forcing a latex paste of the air-setting type or other suitable puncture sealing compound through a puncture aperture in the tire casing and over the puncture in the inner tube, so that the aperture in the tire casing is completely filled with rubber, and an outer patch of rubber is formed on the exterior of the inner tube. Notz discloses that the outer patch of Notz, formed on the exterior of the inner tube, does not permanently adhere to the tire casing. See, for example, col. 2 of Notz, lines 31-39.

What is needed is a tire patching device, system and method that can be used to easily and quickly patch a puncture in the inner tube of a tire using a patch inserted through the outer casing of the tire without removing the tire and/or inner tube from the wheel. What is further needed is a self-contained tire repair unit that is portable, easy to setup and easy to use.

SUMMARY OF THE INVENTION

The present invention satisfies the needs set forth above and, in particular, provides a portable tool that provides immediate permanent and uncomplicated tire repair on the go. More particularly, a tire repair device is provided that can be used to repair bicycle tires and other closed pneumatic applications. In one particular embodiment, the tire repair device is a self-contained unit including a tool body and a cartridge containing an adhesive and a patch. The tool is used to force the adhesive and patch through the outer casing of the tire and into a space between the outer casing and the inner tube. In another particular embodiment of the invention, the tool includes a gas spring to force the adhesive and patch into the space between the outer casing and the inner tube.

Other features, which are considered as characteristic for the invention, are set forth in the drawings and the appended claims.

Although the invention is illustrated and described herein as embodied in a tire repair tool system and method of use, it is nevertheless not intended to be limited to the details shown, since various modifications and structural changes may be made therein without departing from the spirit of the invention and within the scope and range of equivalents of the claims.

The construction of the invention, together with additional objects and advantages thereof, will be best understood from the following description of the specific embodiment when read in connection with the accompanying drawings.

BRIEF DESCRIPTION OF THE DRAWINGS

For a fuller understanding of the nature of the present invention reference should be made to the following detailed description taken in connection with the accompanying drawings in which:

FIG. 3 is a perspective view of a patch in accordance with one particular embodiment of the present invention.

FIGS. 4-7 are used to illustrate a method of using a tire repair device in accordance with one particular embodiment of the present invention.

FIG. 8 is an exploded, cross-sectional view, taken from the side, of a tire repair tool in accordance with another particular embodiment of the present invention.

FIG. 9 is a cross-sectional view of a tire repair tool in accordance with one particular embodiment of the present invention.

FIGS. 10-11 are used to illustrate a method of using the tire repair tool of FIG. 9 in accordance with one particular embodiment of the present invention.

DETAILED DESCRIPTION OF THE PREFERRED EMBODIMENT

Figure 1:
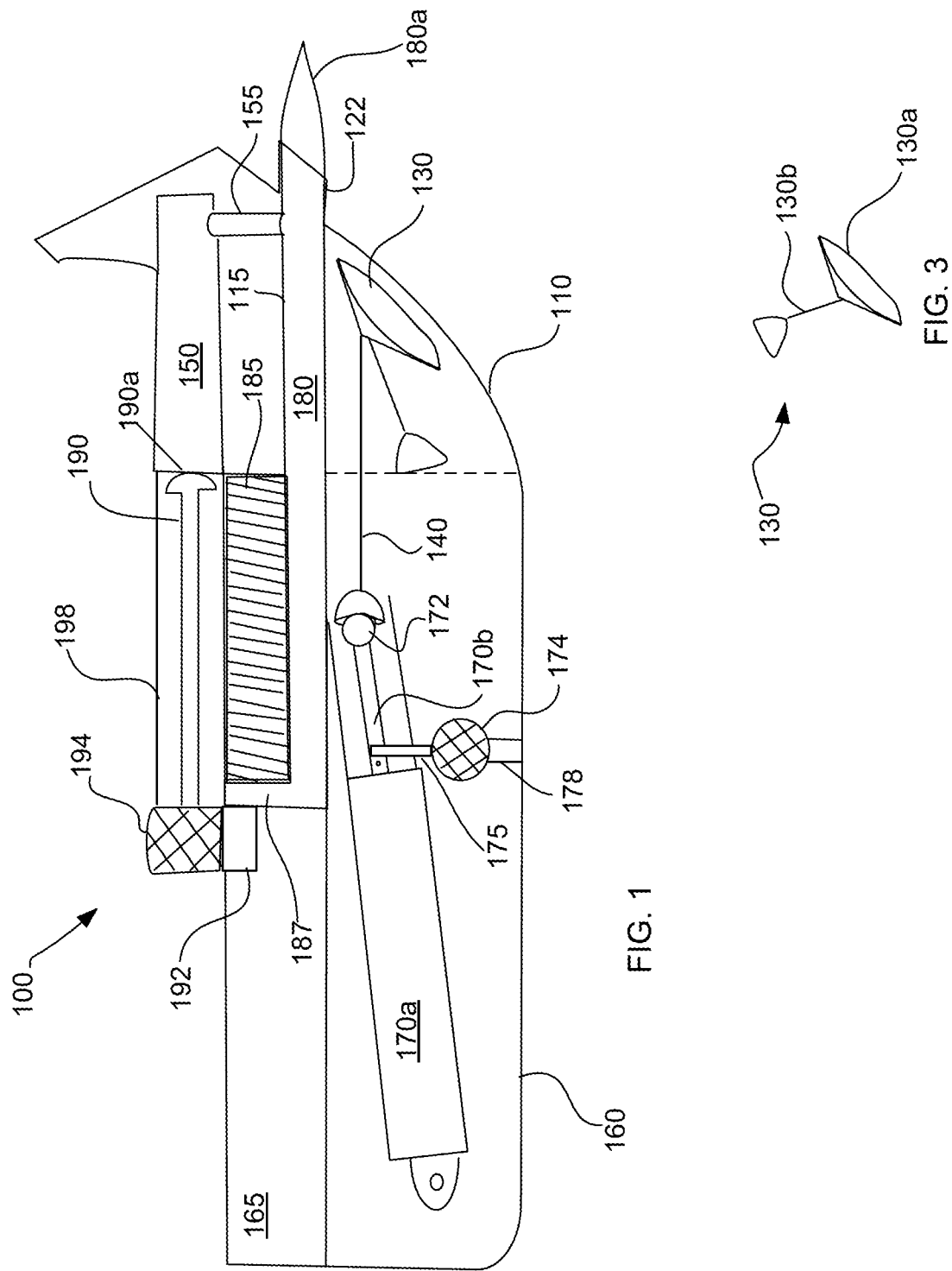
FIG. 1 is a cross-sectional view of a tire repair device in accordance with one particular embodiment of the invention.
Figure 2:
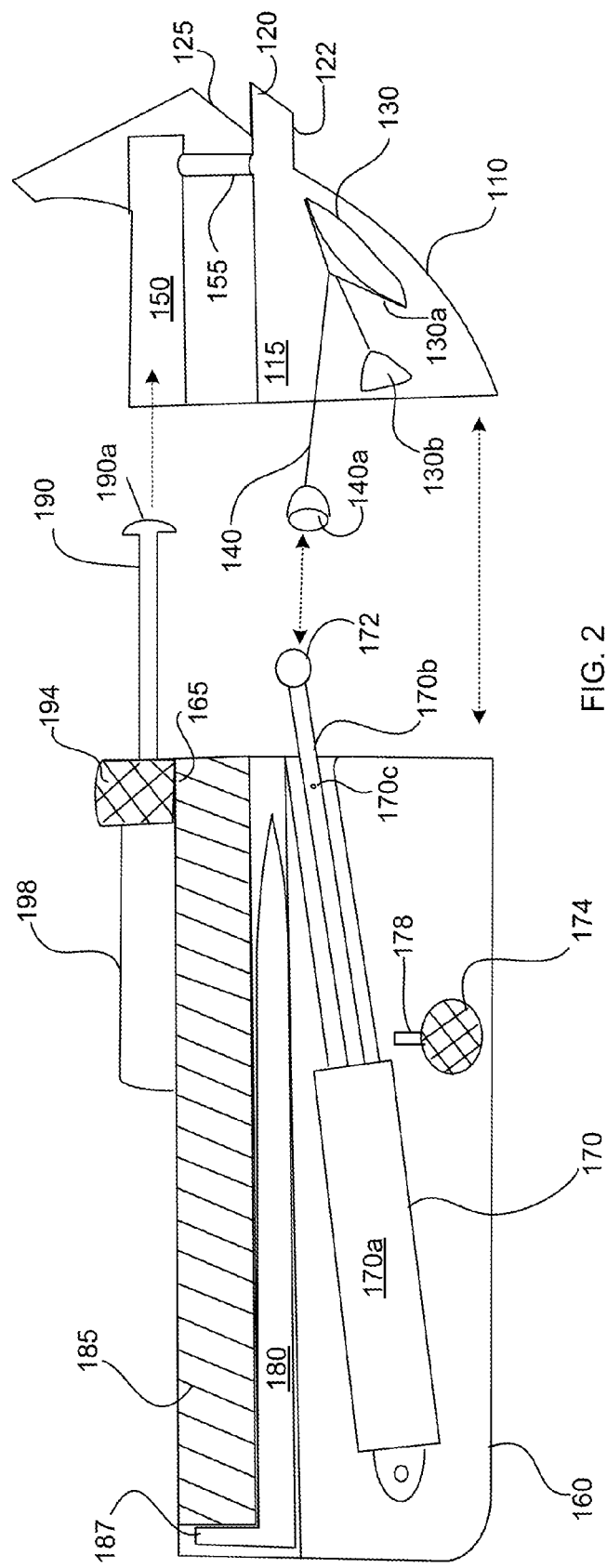
FIG. 2 is an exploded, cross-sectional view of a tire repair device in accordance with another particular embodiment of the present invention.
Figure 8A:
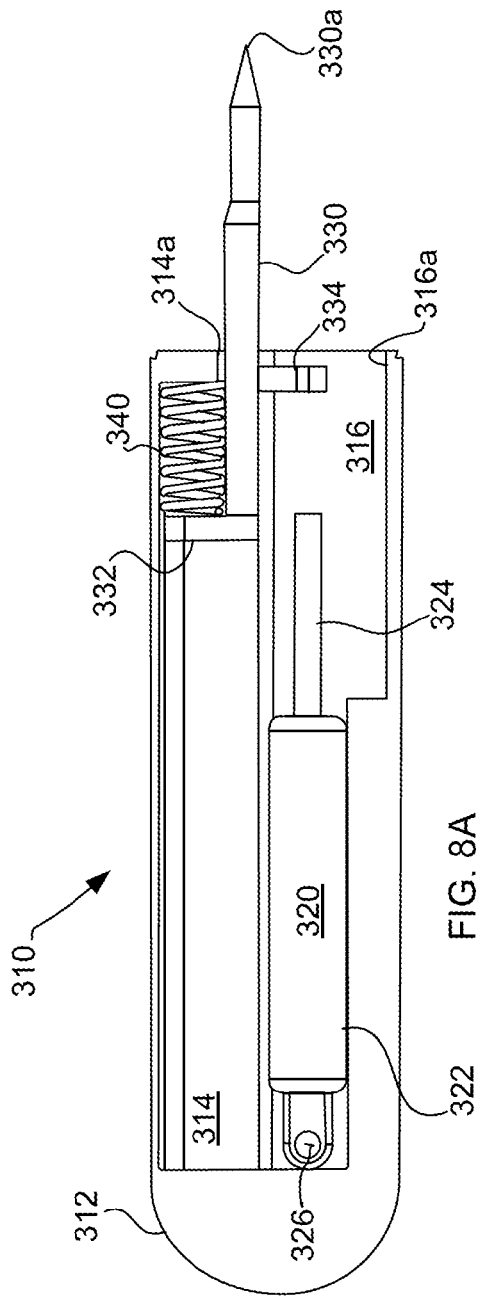
FIG. 8A is a cross-sectional view of a tool body for a tire repair tool in accordance with one particular embodiment of the present invention.
Figure 8C:
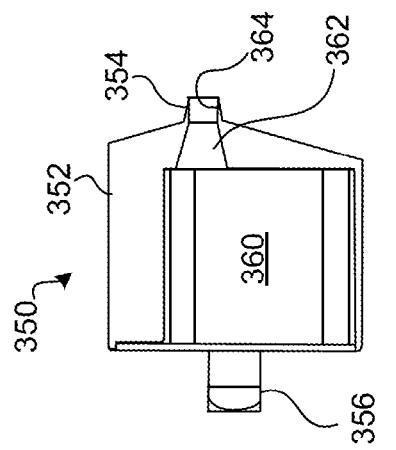
FIG. 8C is a cross-sectional view of a cartridge housing or portion for a tire repair tool in accordance with one particular embodiment of the present invention.
Figure 8B:
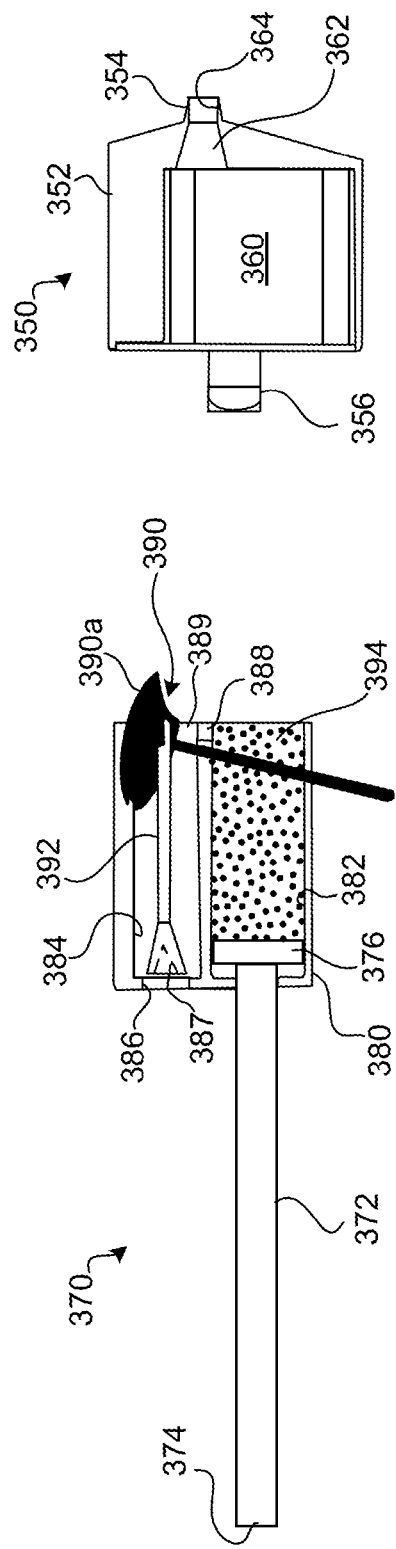
FIG. 8B is an enlarged, cross-sectional view of a patch cartridge for a tire repair tool in accordance with one particular embodiment of the present invention.

Referring now to FIGS. 1-3, a tire repair device 100 is provided. The device 100 is used to permanently repair punctured tire tubes on the go and without removing the wheel and tire from the vehicle. In one particular embodiment of the invention, the tire repair device 100 is used to patch bicycle tires, and in particular, both clincher style and tubular or "sew-up" style bicycle tires. This is not meant to be limiting, however, as the device 100 can be used to repair other types of tires and/or tires for other vehicles. Additionally, it should be noted that the term "puncture", as used herein, encompasses all types of perforations, cuts, holes or wounds to the tire that cause it to lose air.

The tire repair device 100 includes a cartridge portion 110 and a body portion 160 and. In one particular embodiment of the invention, the cartridge portion 110 and body portion 160 are separable from one another, as shown more particularly in FIG. 2, although the body portion 160 and cartridge portion 110 can be made as a single reusable or disposable unit without departing from the spirit and scope of the present invention. However, in a preferred embodiment of the invention, the body portion 160 is provided as a reusable tool housing, while the cartridge portion 110 is made to be disposable.

In the embodiment illustrated in FIGS. 1 and 2, the body portion 160 is a reusable tool housing including a spring 170, which is a gas spring in the current embodiment, a lead point 180 moveable between an extended position and a withdrawn position, and a push rod 190. The cartridge housing or portion 110 includes the front portion of the tool and contains therein a patch assembly 130, a push rod 140 engaged with the patch assembly 130, and a glue cartridge or chamber 150. The front portion of the cartridge portion 110 includes a tube portion 122 having an orifice through which glue from the cartridge 150 and the patch assembly 130 pass. As illustrated in FIG. 3, the patch assembly 130 includes a patch 130a and a tether 130b.

Additionally, if desired, the outer surface of the cartridge portion 110 can also include a surface engaging face 125 that permits the tool 100 to be held flush against the surface of the outer tire 210, and to assist in positioning the outer tube 122 through the puncture in the outer tire 210. For example, the length of the tube 122 can be selected to ensure that when the surface engaging face 125 is flush with the outer surface of the outer tire 210, at least a portion of the tube 122 extends past the inner wall of the outer tire 210, into a space between the outer tire 210 and the inner tube 220. Thus, in the present invention, the cartridge portion 110 and/or tool 100 can be targeted to a particular type of tire, such that the length of the tube 122 is selected to ensure that the orifice is at least flush with the inner wall the outer tire 210, and more preferably, extends beyond the inner wall of the outer 210 into the space above the punctured (and thus deflated) inner tube 220.

Referring back to FIGS. 1-3, in the present preferred embodiment, the body portion 160 mates with the cartridge portion 110 by friction fit and/or by a locking engagement mechanism (not shown). When the two portions 110, 160 are mated, the push rod 190 of the body portion 160 is aligned with the glue cartridge 150 of the cartridge portion, the push rod 140 of the cartridge portion 110 is coupled with an arm 170b of the gas spring 170, and the lead point containing chamber 165 of the body portion 160 is in communication with a patch compartment 115 in the cartridge portion 110. In one particular embodiment of the invention, the gas spring 170 is a mechanically locked, push type gas spring. In another particular embodiment of the invention, a locking type gas spring with an internal return spring is used as the gas spring 170. Additionally, although described in the present, preferred embodiment as being a gas spring, it should be understood that a simple mechanical spring can be used in place of the gas spring 170 without departing from the scope or spirit of the present invention, if desired.

Referring back to FIGS. 1-3, the lead point 187 is spring-biased within the chamber 165. More particularly, in the extended position shown in FIG. 1, the lead point 180 extends from the chamber 165, through a portion of the patch compartment 115, and a pointed end portion 180a extends out from an orifice in the tube 122. A button 190 is used to lock the lead point 180 in the extended position and also releases spring tension to retract the lead point 180 into the withdrawn position. The lead point 180 is maintained in the extended state by a finger 192 of a button 190 contacting a rear face of the lip 187 of the lead point 180. The opposite face of the lip 187 thus compresses the spring 185, which maintains the lip 187 against the finger 192 with the lead point in the extended position, wherein a point 180a of the lead point 180 extends through an outlet hole or orifice formed in the tube 122 of the outer surface of the cartridge portion 110. In the withdrawn position, shown more particularly in FIG. 2, the finger (192 of FIG. 1) is rotated away and no longer holds the lip 187, permitting the spring 185 to relax and simultaneously withdraw the lead point 180 from the patch compartment 115. In this state, the spring 185 maintains the lead point within the chamber 165 of the body portion 160 through contact with the lip 187.

In addition to being rotatable to move the finger 192 into or out of contact with the lip 187, the button 190 is also slidable linearly (i.e., forward and backwards) within the housing 194 to drive the push rod 194 into a chamber of the cartridge portion 110 that includes the adhesive or glue cartridge 150. The push rod 190 includes a plunger 190a fitted at its end distal from the button 190. Sliding the button 190 linearly towards the cartridge portion 110 causes the drive rod to push the plunger 190a forward into the glue cartridge 150, to push the adhesive from the cartridge 150 into the patch compartment 115, via a fluid passageway 155, when the lead point 180 is not present.

The body portion 160 additionally includes a second button 174 that actuates the gas spring 170. More particularly, sliding the button 174 on the track 178 disengages the button finger 175 from a pin or notch 170c on the drive rod 170b of the gas spring 170. This activates the gas spring mechanism 170a, which pushes the drive rod 170b outward and away from the mechanism 170a. A head 172 of the drive rod 170b is coupled to a receiving end or cup 140a of the push rod 140, which, in turn, is hooked to the patch 130a of the patch assembly 130. Thus, with the lead point 180 in the withdrawn position, activation of the switch 174 results in the adhesive and patch 130a being pushed from the patch compartment 115 and out the tube 122 by the coupled drive and push rods 140, 170b.

In one preferred embodiment of the invention, the adhesive used in the glue cartridge 150 acts as both a lubricant for the patch and an adhesive with vulcanizing capabilities. In one particularly preferred embodiment of the invention, the adhesive is infused with fiber, which will form a patch after coming in contact with the inner tube and will seal the puncture on the inner tube like a liquid patch, in addition to the use of the patch 130a, described herein. With regard to the patch 130a, itself, in one particularly preferred embodiment of the invention, the patch is made of a special rubber compound having high elasticity and which is strong enough to withstand pressure up to 200 psi. The tether 130b attached to the patch 130a can be used to center the patch and to allow the patch to be properly positioned, as well as to fill the puncture site in the tire and keep out debris.

In one particular embodiment of the invention, the tire repair tool 100 is sold as a system, including one body portion 160 and a plurality of interchangeable, disposable cartridge portions 110. In one particular embodiment, the plurality of interchangeable, disposable cartridge portions 110 are the same, thus providing a kit including refills. In another particular embodiment of the invention, each of the plurality of interchangeable, disposable cartridge portions 110 is configured for use with a different style bicycle tire, including, but not limited to, clincher, tubular, tubeless, mountain, cross-country, city and/or cruiser bicycle tires. In one particular embodiment of the invention, a kit is provided having a single tool body 160 and a plurality of cartridge portions 110, wherein the tube 122 of each cartridge portion has a different length based on the different thicknesses of the different types of tires (i.e., mountain, city, etc.) for which the specific cartridge portion is to be used. The foregoing is not meant to be limiting, as the repair tool can be provided with only one cartridge portion 110, if desired.

In an alternate embodiment of the present invention, the body portion 160 and cartridge portion 110 may be constructed as a single unit which is disposable or reusable, as desired. For example, an integrated device 100 may be provided wherein the cartridge portion 110 is fixed to the body portion 160, or is hingedly attached to the body portion 160, to allow access to the glue cartridge chamber and the patch compartment. A kit may be sold that includes such a device and additionally includes one or more glue cartridges 150 for use with the device and a plurality of patch assemblies 130. The patch assemblies 130 provided in the presently described embodiment can be the same (and thus, permitting reuse of the device 100 so long as there are patch assemblies and adhesive remaining), or can be different (i.e., a plurality of different patch assemblies, each adapted to a different kind of tire).

In a further embodiment of the invention, the body portion 160 and cartridge portion 110 can be permanently mounted together and/or formed as a unitary body, such that the entire unit 100 is pre-loaded with a single glue cartridge 150 and patch assembly 130. In such a case, the entire device 100 may be disposed of after a single use.

Referring now to FIGS. 1-7, there will be described a method of using a tire repair tool 100, in accordance with one particular embodiment of the invention. The tool 100 is used to inject an adhesive and patch through a puncture in the outer tire 210 of the tire 200, in order to repair a puncture 222 of the inner tube 220.

More particularly, in the initial stage shown in FIG. 4, a tool 100 is provided in the loaded state, i.e., having its lead point 180 in the extended position. First, the puncture through the outer tire 210 is located. If necessary, the lead point 180 is used to clean any debris from the outer tire puncture site. Then, the tire 200 is pinched and the lead point 180 is inserted into the puncture of the outer tire 210. The lead point 180 is worked into the puncture until the tube 122 is also inserted into the outer tire 210 at the puncture. The lead point 180 and tube 122 are inserted until the face 125 of the tool 100 is flush with the outer surface of the tire 200, thus ensuring that the tube 122 is fully inserted into the wall of the outer tire 210 and, preferably, with a portion of the tube 122 extending beyond the inner surface of the outer tire 210.

Once the tool 100 is positioned as described, the button 194 is actuated to move the finger 192 out of contact with the lip 187. In one particular embodiment of the invention, the button 194 is rotated until the finger 192 no longer restrains the lip 187. Once the lip 187 is freed from the restraint of finger 192, the compressed spring 185 relaxes, forcing the lip 187 backwards into the tool body 160 and retracting the lead point 180 into the tool 100. This leaves the tube 122 in, and most preferably, through the outer wall 210 of the tire 200, as shown more particularly in FIG. 5, with its orifice in communication with the patch compartment 115 and unblocked by the lead point 180.

With the lead point 180 withdrawn, the user slides the button 194 forward (towards the tube end of the tool) to push the push rod 190 into the glue cartridge 150 causing the plunger 190a to force the glue or adhesive from the cartridge 150 into the patch compartment 115, via the passageway 155. In one particular embodiment of the invention, the adhesive fills the patch compartment and coats the patch assembly 130 with adhesive.

After the adhesive has been pushed into the patch compartment 115, the user activates the button 174 to release the engagement between the button finger 174a and the pin 170c, in order to activate the compressed gas spring 170. The compressed gas spring 170 pushes the drive rod 170b and the coupled push rod 140 to push the patch 130a out from the adhesive filled patch compartment 115 and into the tire 200 in the space between the outer tire 210 and the inner tube 220, via the tube 122. As the patch 130a is pushed out of the patch compartment 115 and through the tube 122, it acts as a squeegee, pushing the adhesive (152 of FIGS. 6 and 7) into the tire wherein it is deposited on top of the punctured inner tube 220 on and around the puncture 122.

As shown more particularly in FIGS. 6 and 7, although the push rod 140 is sized to push the patch 130a into the tire, its tether 130b remains outside of the tire 200. More particularly, referring now to FIG. 7, once the gas spring 170 has been actuated, and the adhesive and patch 130a have been injected into the tire, the tool 100 is removed, leaving the patch tether 130b outside of the tire. The user can then pull the tether 130b upwards, to position the patch against the inside of the tire 200, against the inner surface of the outer tire 210 and directly over the hole 222 in the punctured inner tube 222. The tether 130b and patch 130a thus fill the puncture site through the outer tire 210 to keep out debris. Additionally, as also shown in FIG. 7, inner tube 220 is inflated, and the air pressure pushes the inner tube 210 against the patch 130*a* and against the inner surface of the outer tire 210 to complete the light vulcanizing of the adhesive and patch. Additionally, if desired, after the tether 130*b* is pulled, the user can also press down on the tire above the patch, so that the vulcanization of the patch to the inner tube 220 can start before inflation of the inner tube 210 begins.

The adhesion and/or vulcanization of the patch 130*a* to the inner tube 210 creates a permanent patch of the tire 200, without requiring the removal of the tire 200 from its rim. In one particular embodiment of the invention, a vulcanizing adhesive is used that vulcanizes the patch to the inner surface of the outer tire 210, as well as the outer surface of the inner tube 220.

Referring now to FIGS. 8-12, there is shown a tire repair tool 300 in accordance with another particular embodiment of the invention. The tire repair tool 300 includes a tool body 310, a cartridge portion 350 and a patch cartridge 370 that is part of, and movable within, the cartridge portion 350. In the present preferred embodiment, the tool body 310 is separable from the cartridge portion 350, and the tool body 310 may be retained, while the cartridge portion (with the patch cartridge 370 nested therein) can be disposed after use.

The tool body 310 is similar to the body portion 160 described in connection with FIG. 1, above. More particularly, the tool body 310 includes a housing portion 312 defining at least two chambers 314, 316, therein. A lead point 330 is slideably received within the chamber 314. Lead point 330 is biased by a simple compression spring 340 engaged with a lip 332 of the lead point 330. A button or other actuator (not shown), is used to control the state of the spring 340, and correspondingly, the state of the lead point 330. More particularly, in the loaded position, the lead point 330 is maintained in the extended position (in which it extends from the housing 312) by a button or actuator not shown. The button or actuator is actuated to release the tension in the compressed spring, which provides a force against the lip 332 and withdraws the lead point 330 further into the chamber 314, such that a point 330*a* of the lead point 330 is withdrawn from the opening 364 of the tube 354. See, for example, FIG. 10. In one particular embodiment of the invention, the body of the lead point 330 is graduated or stepped between the lip 332 and the distal point 330*a*. A cone shaped portion of the tip 330*a* is designed to mate with the frustoconical exit passage 362 of the cartridge portion 350, to limit the amount of the lead point 330 that travels outside of the opening 364 of the tube 354. See, for example, FIG. 9.

Additionally, in contrast to the embodiment of FIGS. 1-3, in the present embodiment, the mechanisms for ejecting the glue 394 and for ejecting the patch 390 have been combined. More particularly, in the present preferred embodiment, the lead point 330 additionally includes a finger 334 that is slidable through the chamber 316 of the tool body 310. The chamber 316 additionally includes a spring 320 mounted therein by a pin 326. As with the previously disclosed embodiment, the spring 320 is a gas spring. Note that, as discussed above, a simple compression spring or other type of spring may be used in place of a gas spring, without departing from the scope or spirit of the present invention. In the present particular embodiment, a button or other actuator (not shown) is activated to initiate the gas spring mechanism 322, which pushes the drive rod 324 outward and away from the mechanism 322.

The cartridge portion 350 of the tool 300 includes a housing 352 including a body cavity or chamber 360 in communication with the chambers 314, 316 of the tool body 310, which assembled. distal from the tool body, the outer housing 352 includes a graduated tube 354 having an opening 364 in fluid communication with the chamber 360, via a graduated passageway 362. The cartridge portion 350 can be mated with the tool body 310 using any type locking mechanism, as desired. In the embodiment illustrated, the cartridge portion has a pair of locking fingers or prongs 356 that engage notches or indentations 312*a* in the outer surface of the tool body 310, or vice-versa. See, for example, the engagement of finger 356 with notched indent 312*a* of FIGS. 12 and 13. Note however, that this is not meant to be limiting, as other locking mechanisms including, but not limited to, snaps, threads, bayonet connectors, friction fit connection, etc., can be used without departing from the scope or spirit of the present invention.

The cartridge portion 350 includes therein a patch cartridge 370. Patch cartridge 370 is configured to slide between two extreme positions in the chamber 360 of the cartridge portion 350. Initially, in the "loaded" configuration shown in FIG. 9, the extended lead point 330 holds the patch cartridge 370 in the first or reserve position. Once the lead point 330 is moved to the withdrawn position as shown in FIG. 10, the patch cartridge 370 moves to the second or discharge position. In one particular embodiment of the invention, the patch cartridge 370 is spring biased to automatically move from the first position to the second position when the lead point 330 is withdrawn from the cartridge portion 350. In one particular embodiment, a compression spring (not shown) is disposed between the patch cartridge 370 and the inner wall of the chamber 360, distal from the lead point 330, which spring drives the patch cartridge 370 into the second position, and maintains it in the second position, upon withdrawal of the lead point 330.

The patch cartridge 370 includes a housing 380 having two compartments 382, 384. The first compartment 382 is configured to receive either a loose adhesive 394 or a glue cartridge containing an adhesive 394. The adhesive 394 can be the same adhesive or glue as was previously described in connection with the embodiment of FIGS. 1-7. The plunger 376 of the drive rod 372 is located in the chamber 382, while the body of the drive rod passes through an opening in the housing 380. A channel 388 provides a fluid pathway between the chamber 382 to pass into the chamber 384.

The chamber 384 of the housing 380 includes a patch assembly 390 attached to a drive rod 392. The patch assembly 390 includes a patch attached to a stem. The patch assembly can be the same configuration and materials as described in connection with FIGS. 1-7, and in particular, with FIG. 3. The patch assembly 390 is attached to a push rod 392. In the present particular embodiment, a head portion of the push rod 392 includes a conical recess 387, configured to receive the conical point 330*a* of the lead point 330. The chamber 384 includes an opening 386, sized to receive the lead point 330 therethrough, in alignment with the conical cavity 387. Additionally, the chamber 384 is open at its distal side 389 to permit the patch assembly 390 and adhesive to be pushed out of the chamber 384 through the frustoconical exit passage 362 and out the orifice or opening 364.

Referring now to FIGS. 8-13, the operation of the tire repair tool 300 will be described. As with the embodiments of FIGS. 1-7, the user first locates the puncture through the outer tire and uses the distal point 330*a* of the lead point 330 to clean any debris from the puncture. The user then inserts the distal point 330 into the outer tire puncture until the tube 354 is through the outer tire puncture and, preferably, an end face of the cartridge portion 350 abuts the outer surface of the outer tire, in the same manner as is shown and described in connection with FIG. 4. With the tube 354 in the puncture, the tension on the compressed spring 340 (FIG. 9) is released (FIG. 10) through the actuation of a button or actuator (not shown). This causes the lead point to withdraw backwards into the tool into its withdrawn position (FIG. 10). Simultaneously with the withdrawal of the lead point 330, the patch cartridge 370 slides to the discharge position in the chamber 360 (FIG. 10). As discussed herein, the patch cartridge 370 may be biased into this position by a spring (not shown). The point 330a of the lead point 330 is guided into the conical recess 387 of the push rod 392 as the patch cartridge 370 slides into place (FIG. 10).

Additionally with the patch cartridge in its second position, a distal end 374 of the push rod 372 is slid into alignment with one side face of the finger 334 of the lead point 330. The opposite side face of the finger 34 is aligned with the distal end of the drive rod 324 of the spring 320 (FIG. 10). In one particular embodiment of the invention, the force resulting from the release of the spring 340 not only pushes the lead point 330 into the withdrawn position, but additionally compresses or loads the spring 320, via the force exerted by the finger 334 against the push rod 324. As discussed herein, in one particular embodiment, the spring 320 is a gas spring, and in this embodiment, the force against the drive rod 324 is used to compress the gas in the spring 320. Note however, a compression spring can also be used as the spring 320, if desired, wherein the force on the drive rod 324 caused by the finger 334 will compress the spring. The spring will be locked in this position by a catch or button, not shown.

Figure 12:
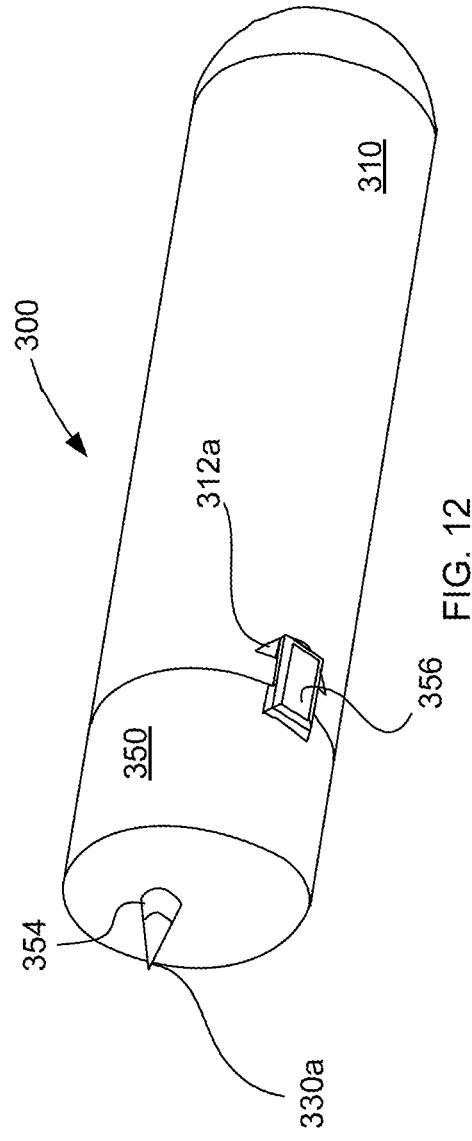
FIG. 12 is a partial perspective view of a tire tool in accordance with one particular embodiment of the present invention.
Figure 13:
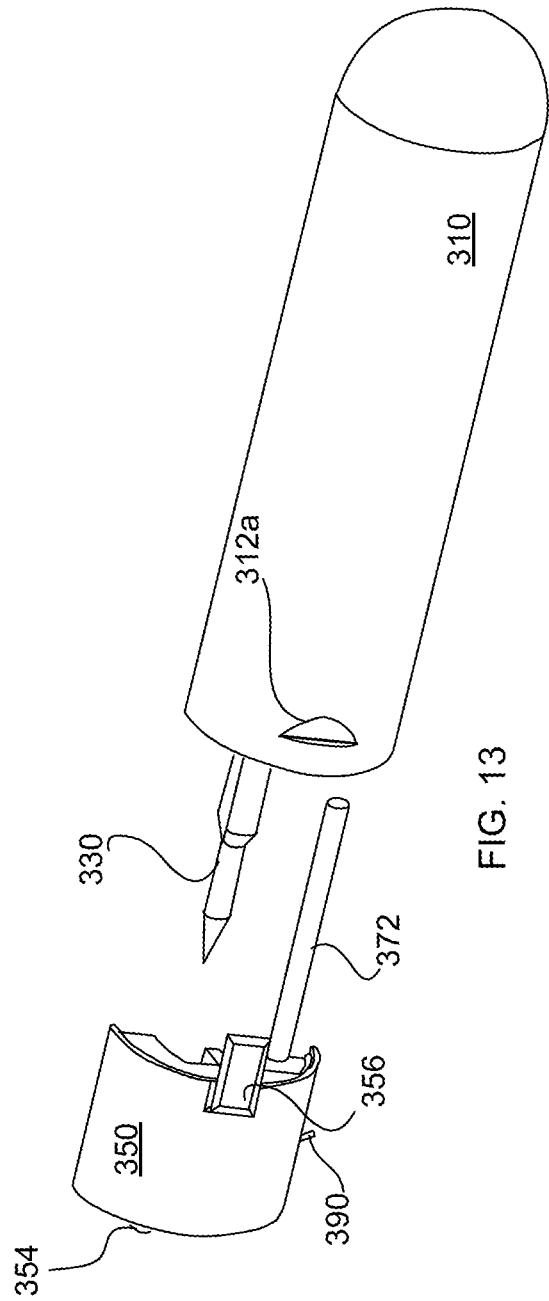
FIG. 13 is a exploded, cut away view of a tire repair tool in accordance with one particular embodiment of the present invention.

Referring now to FIGS. 6 and 12, the tool 300 of the present embodiment operates generally in the same manner as described in connection with the tool 100 of the first embodiment. More particularly, with the tube 354 of the tool 300 inserted into the puncture through the outer tire (for example, 210 of FIG. 6), the tool 300 injects the patch portion 390a of the patch assembly 390 and adhesive 394 into the space between the outer tire (210 of FIG. 6) and the inner tube (220 of FIG. 6) with a portion of the stem of the patch assembly 390 remaining outside of the outer tire (210 of FIG. 6). However, the tool 300 discharges the adhesive and patch assembly in a slightly different manner than tool 100.

Referring more particularly to FIG. 11, the user will activate a button or actuator (not shown) that will release the spring 320. In particular, activation will cause the spring to drive the drive rod 324 hard against the associated face of the finger 334 and pushes the finger 334 towards the cartridge portion 350 of the tool 300. The force from the spring 320 on the finger 334 causes the adhesive to be pushed by the push rod 372 from the adhesive chamber 382 into the patch chamber 384, via the passageway 388. Simultaneously, the force from the spring 320 on the finger 334 drives the lead point 330 forward, which correspondingly drives the push rod 392 forward to eject the patch portion 390a of the patch assembly 390 from the chamber 384 and into the space between the outer tire and the inner tube over the puncture in the inner tube. As with the previously described embodiment, the patch portion 390a of the patch assembly 390 pushes the adhesive from the chamber 384 and out the orifice 364 as it exits, thus acting like a squeegee, whereas the adhesive helps lubricate the patch to facilitate its exit from the cartridge portion 350. The adhesive 394 is pushed into the tire wherein it is deposited on top of the punctured inner tube (220 of FIG. 6) on and around the puncture (122 of FIG. 6).

As discussed above, although the push rod 392 is sized to push the patch portion 390a into the tire, a graspable portion of its tether remains outside of the tire when the tool 300 is removed. The user can then pull the tether upwards, to position the patch against the inside of the tire, against the inner surface of the outer tire and directly over the hole in the punctured inner tube. The tether and patch portion 390a of the patch assembly 390 thus fill the puncture site through the outer tire to keep out debris.

Additionally, in the same manner as is described above in connection with FIG. 7, the inner tube is inflated, and the air pressure pushes the inner tube against the patch 390a and against the inner surface of the outer tire to complete the light vulcanizing of the adhesive and patch. Additionally, if desired, after the tether is pulled, the user can also press down on the tire above the patch, so that the vulcanization of the patch to the inner tube can start before inflation of the inner tube begins.

The adhesion and/or vulcanization of the patch 390a to the inner tube (see, for example, 210 of FIG. 7) creates a permanent patch of the tire, without requiring the removal of the tire from its rim. In one particular embodiment of the invention, a vulcanizing adhesive is used that vulcanizes the patch to the inner surface of the outer tire, as well as to the outer surface of the inner tube.

From the foregoing, it can be seen that the present invention provides a convenient, portable tire repair tool that saves time and money. The present invention eliminates the inconveniences of traditional tire repair, which requires removal and reinstallation of the tire. Rather, the tire repair tool of the present invention installs a patch through the existing exterior puncture of the tire to seal and permanently patch an inner tube of the tire, allowing the tire to remain attached to the rim during the repair.

Although described herein as including a reusable body portion, it should be understood that the present invention can be made as a single, disposable unit, or even as a single, entirely reusable unit, without departing from the scope or spirit of the present invention. Additionally, wherein the use of a glue cartridge is described, the invention is not meant to be limited solely thereto, as loose adhesive or glue may be injected into the compartment described herein as holding a glue cartridge, if desired. Alternately, if desired, in one particular embodiment of the invention, the adhesive can be located directly in the patch compartment with the patch assembly, thus eliminating the need to push the glue from a glue cartridge or compartment into the patch compartment, without departing from the scope and spirit of the present invention.

Thus, the present invention provides a convenient, easy-to-use, tire repair tool, system and method useful for permanently patching tires, in situ, without removing the tire from the wheel or the wheel from the conveyance. Accordingly, while a preferred embodiment of the present invention is shown and described herein, it will be understood that the invention may be embodied otherwise than as herein specifically illustrated or described, and that within the embodiments certain changes in the detail and construction, as well as the arrangement of the parts, may be made without departing from the principles of the present invention as defined by the appended claims.

I claim:

1. A tire repair tool, comprising:
    a housing having an outlet tube, the housing, including:
        an adhesive;
        a patch assembly including a patch body attached to a tether; and
        a spring;
    the spring configured to eject the adhesive and patch body out of the housing via the outlet tube.

2. The tool of claim 1, wherein the spring is a gas spring.

3. The tool of claim 1, wherein the housing includes a body portion and a cartridge portion separable from said body portion, wherein the spring is located in the body portion and the patch assembly and adhesive are located in the cartridge portion.

4. The tool of claim 1, further including a lead point actuable between a first extended position in which a point of the lead point extends outside of the housing from an orifice of the outlet tube and a second withdrawn position in which the lead point is withdrawn into the housing and out of said outlet tube.

5. The tool of claim 4, further comprising a patch cartridge slidable within said housing, said patch cartridge including a first compartment including an adhesive and a second compartment including the patch assembly, said patch cartridge including a fluid passageway between the first compartment and the second compartment, the tire repair tool further including a push rod for pushing the adhesive from the first compartment into the second compartment via the fluid passageway.

6. The tool of claim 5, wherein said lead point is additionally driven by said spring to push the patch body and adhesive out of said housing.

7. The tool of claim 6, wherein actuation of said spring also causes a portion of said lead point to push the push rod.

8. The tool of claim 1, further including a drive rod engaged with said spring that pushes the patch body out of the outlet tube upon actuation of the spring.

9. The tool of claim 8, wherein the adhesive is in a first compartment of the housing and the patch assembly is located in a second compartment of the housing and the housing includes a fluid passageway between the first compartment and the second compartment, the tire repair tool further including a push rod for pushing the adhesive from the first compartment into the second compartment via the fluid passageway.

10. A method of repairing a tire on a wheel or rim, comprising the steps of:
providing a tire repair tool according to claim 1;
inserting the outlet tube into a puncture of the outer tire;
with the spring, ejecting the adhesive and patch body out of the housing via the outlet tube and into the tire without removing the tire from the wheel or rim.

11. The method of claim 10, wherein the tire repair tool housing includes a body portion and a cartridge portion separable from the body portion, wherein the spring is located in the body portion and the patch assembly and adhesive are located in the cartridge portion.

12. The method of claim 10, wherein the adhesive is located in a first compartment of the housing and the patch assembly is located in a second compartment of the housing, the method further comprising the step of transferring the adhesive from the first compartment into the second compartment prior to the ejecting step.

13. The method of claim 10, wherein the tool further comprises a lead point actuable between a first extended position in which a point of the lead point extends outside of the housing from an orifice of the outlet tube and a second withdrawn position in which the lead point is withdrawn into the housing and out of the outlet tube, and wherein the outlet tube is inserted in the inserting step with the lead point extended and, after the inserting step, the lead point is moved to its second withdrawn position.

14. The method of claim 10, further comprising the steps of:
after the injecting step, pulling the tether to pull the patch body against an inner surface of the outer tire.

15. The method of claim 14, further comprising the step of:
inflating an inner tube disposed in the outer tire to push the inner tube against the patch body in an area of a puncture in the inner tube.

16. The method of claim 10, further comprising the steps of:
after the injecting step, pulling the tether to pull the patch body against an inner surface of the outer tire;
subsequently, pushing the tire to adhere the patch to an upper surface of an inner tube disposed in the outer tire in an area of a puncture in the inner tube; and
inflating the inner tube.

17. A tire repair tool kit, comprising:
a body portion including a spring;
a plurality of cartridge portions, each separable from and engageable with said body portion, each cartridge portion including a push rod attached to a patch body of a patch assembly and an outlet tube;
said body portion configured to mate with each cartridge portion of said plurality of cartridge portions such that release of said spring causes a force to be applied to said push rod of the mated cartridge portion to eject the patch body out from said outlet tube.

18. The tire repair tool kit of claim 17, wherein each cartridge portion of said plurality of cartridge portions additionally includes an adhesive ejected from said outlet tube with said patch body.

19. The tire repair tool kit of claim 18, wherein the cartridge portion includes a push rod for pushing the adhesive in a cartridge portion mated to the body portion from a first compartment into a second compartment containing the patch assembly one of prior to activation of said spring or as a consequence of activation of said spring.

20. The tire repair tool kit of claim 18, wherein each of the plurality of cartridge portions is configured to have at least one of the outlet tube, the adhesive and the patch assembly selected for use with a particular type of tire different from the any other cartridge portion of the plurality.

* * * * *